United States Patent [19]
Wakui et al.

[11] Patent Number: 5,152,246
[45] Date of Patent: Oct. 6, 1992

[54] METHOD OF MONITORING MILKING

[75] Inventors: Akio Wakui; Hisatoshi Seki; Toshyuki Okutani; Osamu Tomisawa, all of Nagano, Japan

[73] Assignee: Arion Machinery Co., Ltd., Nagano, Japan

[21] Appl. No.: 704,188

[22] Filed: May 22, 1991

[30] Foreign Application Priority Data

Jun. 30, 1990 [JP] Japan .................................. 2-174119
Oct. 15, 1990 [JP] Japan .................................. 2-108333

[51] Int. Cl.$^5$ .............................................. A01J 3/00
[52] U.S. Cl. ............................................. 119/14.15
[58] Field of Search ............... 119/14.01, 14.02, 14.08, 119/14.14, 14.15, 14.17

[56] References Cited

U.S. PATENT DOCUMENTS 2,039,421  5/1936  Jansson .......................... 119/14.02
4,064,838  12/1977  Mukarousky et al. ........... 119/14.08
4,292,926  10/1981  Tilman .......................... 119/14.08 X
4,572,104  2/1986  Rubino ........................... 119/14.02

FOREIGN PATENT DOCUMENTS

59-169428  9/1984  Japan .
63-68758   5/1988  Japan .

Primary Examiner—Gene Mancene
Assistant Examiner—Thomas Price

[57] ABSTRACT

A flow rate of milk during milking is measured to obtain a detection value (a second detection value) $D_N$ having a correlation with respect to the whole amount of milk during a fixed sampling period Ts at any time and a first detection value $D_{N-1}$ having a correlation with respect to the whole amount of milk during the fixed sampling period Ts at a time earlier by a fixed time To than the time for the fixed sampling period Ts for the second detection value. A variation ratio $C_N$ of the second detection value $D_N$ to the first detection ratio $D_{N-1}$ is calculated by using an equation of (second detection value $D_N$)/(first detection value $D_{N-1}$) and the variation ratios $C_N$ ($C_1$ . . . ) are monitored to detect the variation degree and the variation direction (increasing and decreasing direction) of the flow rate of milk so that the milking condition is monitored when a cow is milked by a milking machine.

5 Claims, 7 Drawing Sheets

METHOD OF MONITORING MILKING

BACKGROUND OF THE INVENTION

1. Field of the Invention

The present invention relates to a method of monitoring milking conditions when milking is made by a milking machine.

2. Description of the Relevant Art

Generally, when a milking machine is employed to milk a cow, it is necessary to determine whether the milking is finished at a proper time. If the milking is made excessively, cellular tissue of the nipples of a cow is left under vacuum. Thus, there is increased danger that the cow develops mastitis, and the presence of somatic cells in the milk is increased. Accordingly, it is very important that completion of milking is determined exactly and surely.

Thus, recently, a milking completion determination method using a flow rate sensor is adopted to automatically remove a milking unit.

In the determination using the flow rate sensor, a STET of milk is measured by the sensor and when an actually measured value of the flow rate at the end of milking is lower than a predetermined reference value of the flow rate (for example, about 0.2 to 0.8 kg/min), it is determined that the milking is finished. The present Applicant has proposed, for example in Japanese Utility Model Unexamined Publication No. 63-68758, a milking completion detection apparatus in which a time during which an actually measured value of the flow rate of milk is lower than a reference value of the flow rate of milk is integrated and when the integrated value exceeds a predetermined value the milking is finished.

Usually, teat cup liners are attached to four nipples of a cow, respectively, so that the four nipples are milked simultaneously, while it is rare that the milking for all four nipples is finished simultaneously and the milking completion time for each nipple is often scattered. Accordingly, if the finishing time for milking a first nipple is much earlier than those for the other nipples, the first nipple is subjected to excessive milking. However, in the conventional completion determination method, it is difficult to detect such stepwise reduction of the flow rate of milk.

Figure 8:
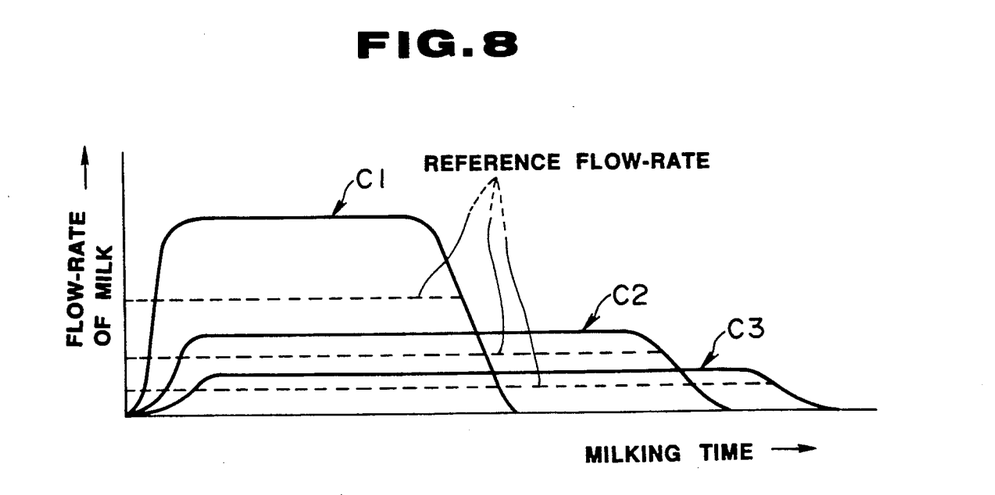
FIG. 8 is a characteristic diagram showing a relation of flow rates of milk versus milking time.

Further, in order to avoid potential mastitis and increased somatic cells in milk due to the excessive milking, it is put into practice that the completion of milking is determined when a slight amount of milk remains in a nipple. In this case, however, it is necessary to set the reference value of the flow rate of milk to about 0.8 to 1.0 kg/min, for example. However, as show in FIG. 8; there are a well milking cow C1, a poorly milking cow C2, and a very poorly milking cow C3; and individual cows are different from one another. Thus, even if the reference value of the flow rate is merely set to a large value, there is a problem that the completion of milking is determined at the beginning of the milking in the case of the cow C3. On the other hand, for the cow C1, it is necessary to set the reference value of the flow rate to a larger value (for example, 1.0 to 2.0 kg/min) in view of the protection of the cow from excessive milking. In either case, the conventional determination method of setting the uniform reference value of the flow rate is difficult to determine the completion of milking exactly and surely.

SUMMARY OF THE INVENTION

It is an object of the present invention to provide a milking monitoring method capable of detecting when the time for finishing the milking of a first nipple is extremely earlier as compared the other nipples exactly and capable of avoiding the nipple from being subjected to excessive milking.

Further, it is another object of the present invention to provide a milking monitoring method capable of detecting the completion of milking preparatorily even if there are individual differences such as a well milking cow, a poorly milking cow and the like.

Furthermore, it is still another object of the present invention to provide a milking monitoring method capable of analyzing actual milking conditions exactly and collectively controlling cow bodies optimally.

In order to achieve the above objects, according to the milking monitoring method of the present invention, a flow rate of milk during milking is measured to obtain a detection value (a second detection value) $D_N$ having a correlation with respect to the whole amount of milk during a fixed sampling period Ts at any time and a first detection value $D_{N-1}$ having a correlation with respect to the whole amount of milk during the fixed sampling period Ts at a time earlier by a fixed time To than the time for the fixed sampling period Ts for the second detection value. A variation ratio $C_N$ of the second detection value $D_N$ to the first detection ratio $D_{N-1}$ is calculated by using an equation of (second detection value $D_N$)/(first detection value $D_{N-1}$) and the variation ratios $C_N$ ($C_1$ . . . ) are monitored to detect the variation degree and the variation direction (increasing and decreasing direction) of the flow rate of milk so that the milking condition is monitored when a cow is milked by a milking machine.

In this case, the fixed sampling periods Ts are successively set at intervals of a fixed time to detect the variation ratios $C_1$ in the milking successively so that the detection values $D_{N-1}$, $D_N$ . . . can be calculated by a sum total or an average value of the flow rate data for each fixed sampling time Tr for the fixed sampling period Ts.

Further, as a monitoring method, a reference ratio Cs in the decreasing direction of the flow rate is previously set to compare the variation ratio $C_N$ with the reference ratio Cs in the decreasing direction, so that when the variation ratio $C_N$ exceeds the reference ratio Cs, an alarm can be issued. Thus, the degree of variation in the decreasing direction of the flow rate can be determined and it can be detected that when milking approaches the end thereof and when milking for some of the nipples has been finished. Further, the variation ratio $C_N$ can be compared with the reference ratio (decreasing ratio) Cs and the time when the variation ratio $C_N$ exceeds the reference ratio Cs is defined as a milking completion reference time Se, so that two or three milking times, until the milking completion reference time Se (inherent milking time Tc), a milking time from the milking completion reference time Se (additional milking time Ta) and a continuous milking time Tp equal to a sum of the inherent milking time Tc and the additional milking time Ta; can be repeatedly displayed in order at regular intervals after an elapse of the milking completion reference time Se.

DETAILED DESCRIPTION OF THE PREFERRED EMBODIMENT

A preferred embodiment of the present invention is now described in detail with reference to the accompanying drawings.

First of all, the whole configuration of a milking machine which can implement a milking monitoring method according to the present invention is described with reference to FIGS. 3 and 4.

Figure 4:
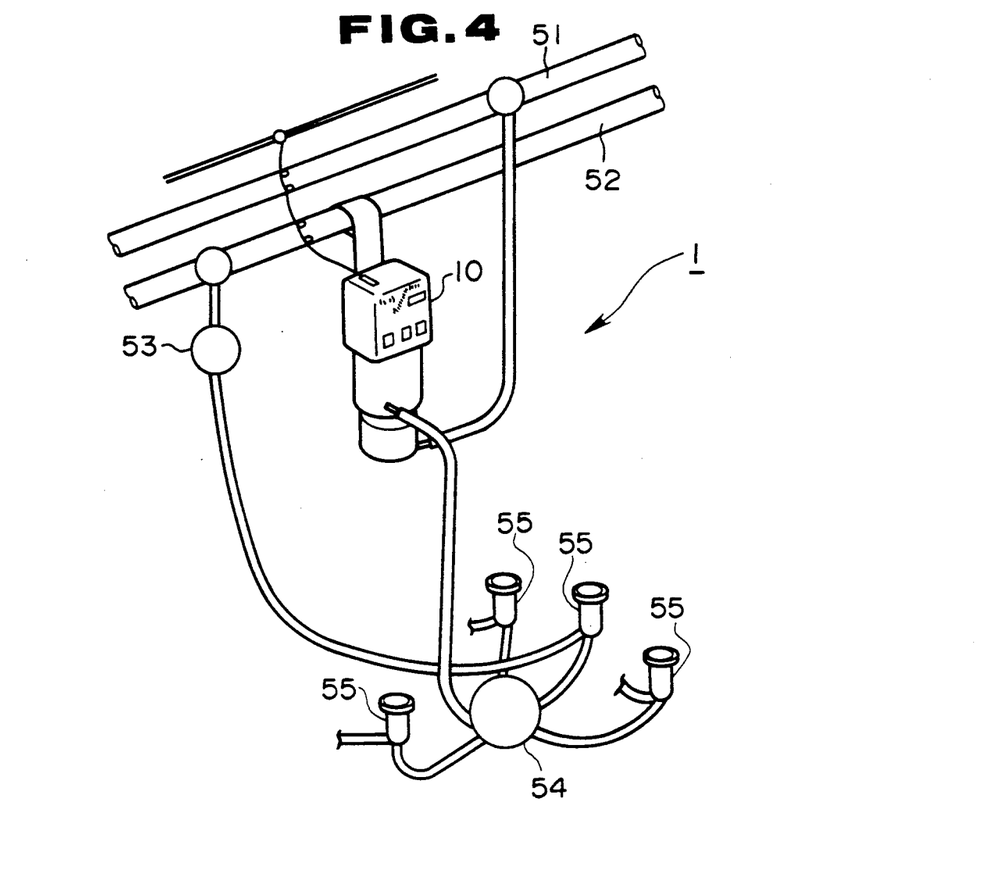
FIG. 4 is a perspective view showing a configuration of the milking machine.

FIG. 4 shows an outer construction of a milking machine 1. In FIG. 4, numeral 51 denotes a milk pipe and numeral 52 denotes a vacuum pipe. The milk pipe 51 is coupled with a manifold 54 through a controller 10, and four teat cup liners 55 each attached to a nipple of a cow are coupled with the manifold 54 and are further coupled with the vacuum pipe 52 through a pulsator 53.

Figure 3:
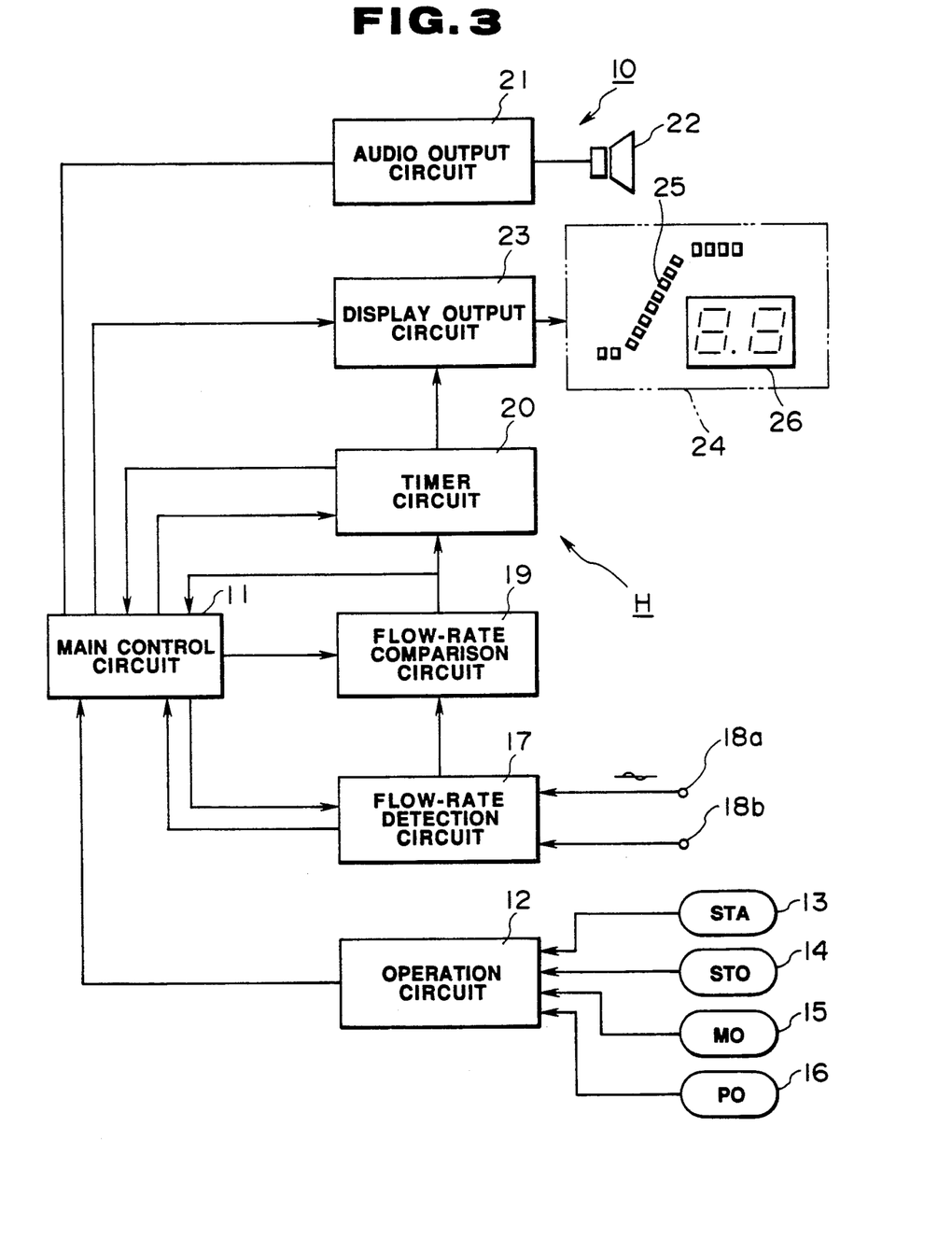
FIG. 3 is a circuit block diagram of a control system of a milking machine.

The controller 10 is configured as shown in FIG. 3. In FIG. 3, numeral 11 denotes a main control circuit. A start switch 13, a stop switch 14, a mode change-over switch 15 and a power switch 16 are connected through an operation circuit 12 to the main control circuit 11.

On the other hand, numeral 17 denotes a flow rate detection circuit. A pair of electrodes 18a and 18b are connected to the flow rate detection circuit 17. The pair of electrodes 18a and 18b are provided in a milking line and an electrical resistance value of milk is measured by flowing a current between the pair of electrodes 18a and 18b (see Japanese Unexamined Patent Publication No. 59-169428, for example). The electrical resistance value is varied in inverse proportion to a flow rate of milk and the flow rate detection circuit 17 produces an actual value of the flow rate corresponding to the flow rate shown in FIG. 2(a).

Further, H represents a milking completion detection system. In the milking completion detection system H, the actual flow rate produced by the flow rate detection circuit 17 is compared with a predetermined reference flow rate (shown by E of FIG. 2(a)) produced by the main control circuit 11 in a flow rate comparison circuit 19. The comparison result thereof is supplied to the main control circuit 11. When the actual flow rate is smaller than the reference flow rate, a completion timer in a timer circuit 20 is operated to integrate the time. The completion of milking is determined by the completion timer, so that a system including an audio output circuit 21 and a loudspeaker produces a removal alarm for removing the teat cup liners 55 from the nipples of the cow. In this case, the teat cup liners 55 can be removed automatically. The integrated time is displayed by a dot-type display 25 of a display unit 24 through a display output circuit 23. Numeral 26 denotes a digital display unit for displaying a time.

Figure 1:
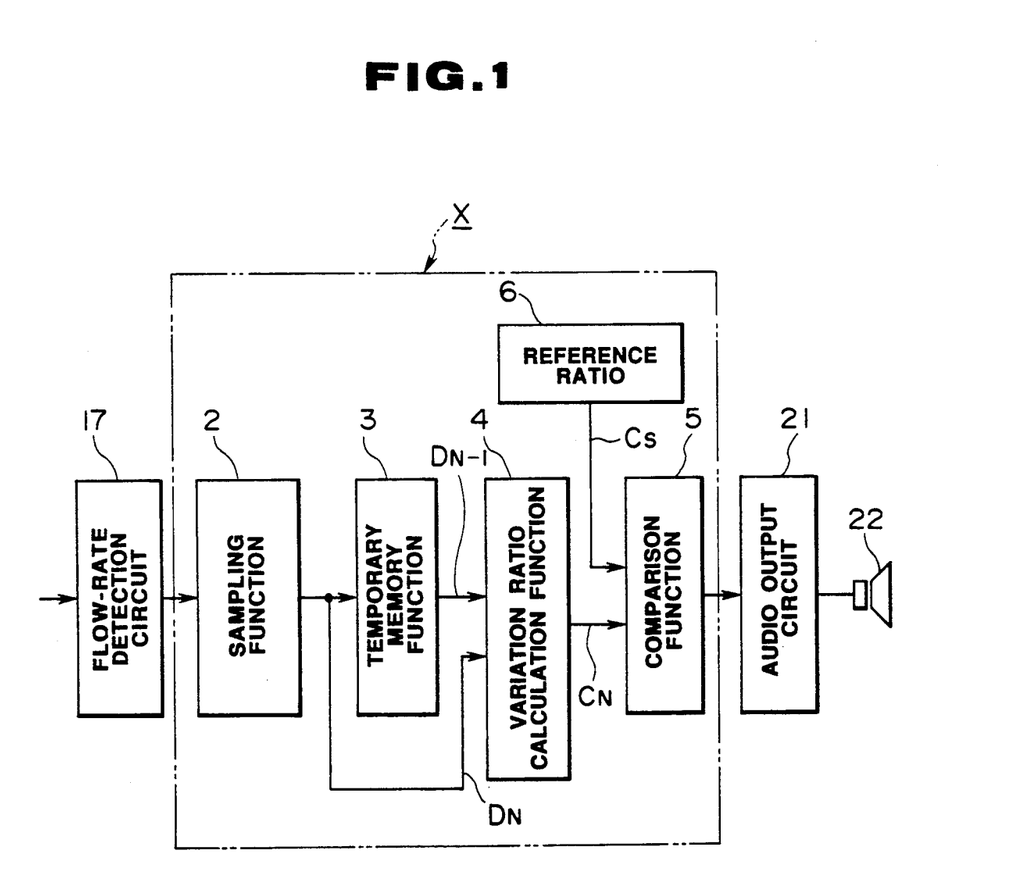
FIG. 1 is a functional block diagram of a control system capable of implementing a milking monitoring method according to the present invention.

Referring to FIGS. 1 and 2, the milking monitoring method of the present invention is now described together with a function of the main control circuit 11.

In FIG. 1, X represents a variation ratio detection system. The actual flow rate obtained in milking from the electrodes 18a and 18b and the flow rate detection circuit is applied to the variation ratio detection system X in the main control circuit 11. The variation characteristic of the actual flow rate is shown in FIG. 2(a).

In the variation rate detection system X, a sampling function portion 2 samples the actual flow rate obtained from the flow rate detection circuit 17 at a fixed sampling time Tr during the whole milking period to produce a flow rate data and further obtains detection values $D_1 \ldots$ having correlation with respect to the whole amount of milk during a fixed sampling period Ts (Ts > Tr), that is, the detection values $D_1 \ldots$ using a sum total or an average value of all of n flow rate data based on the sampling time Tr included in the fixed sampling period Ts. Such detection method observes scattered actual values of the flow rate for a short time. The fixed sampling time Ts is successively set at regular intervals in the whole or a part of the milking period so that the detection values $D_1 \ldots$ are obtained successively.

Figure 2A:
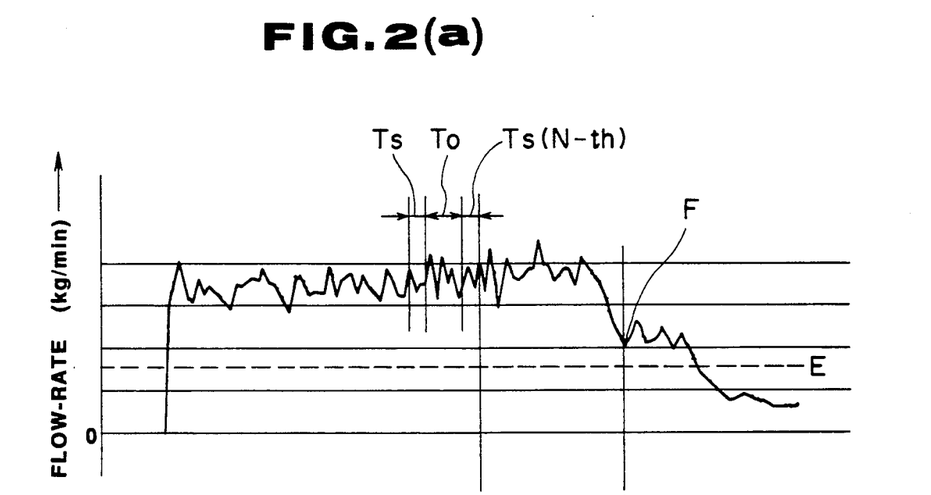
FIG. 2 is a characteristic diagram showing an actual flow rate and a variation ratio for time.

It is assumed that, in the N-th fixed sampling period Ts of FIG. 2(a), a detection value (second detection value) $D_N$ is obtained. In this case, the second detection value $D_N$ is applied to a variation ratio calculation function portion 4 and a temporary memory function portion 3 using a shift register or the like simultaneously. The temporary memory function portion 3 stores any input detection value and produces it after an elapse of a fixed time To. Accordingly, the variation ratio calculation function portion 4 is supplied with the second detection value $D_N$ together with a first detection value $D_{N-1}$ detected at the time earlier by the fixed time To than the time of detection of the second detection value. Accordingly, the variation ratio calculation function portion 4 calculates a variation ratio $C_N$ of the second detection value $D_N$ to the first detection value $D_{N-1}$, that is, the variation rate $C_N$ = second detection value $D_N$/first detection value $D_{N-1}$.

Figure 2B:
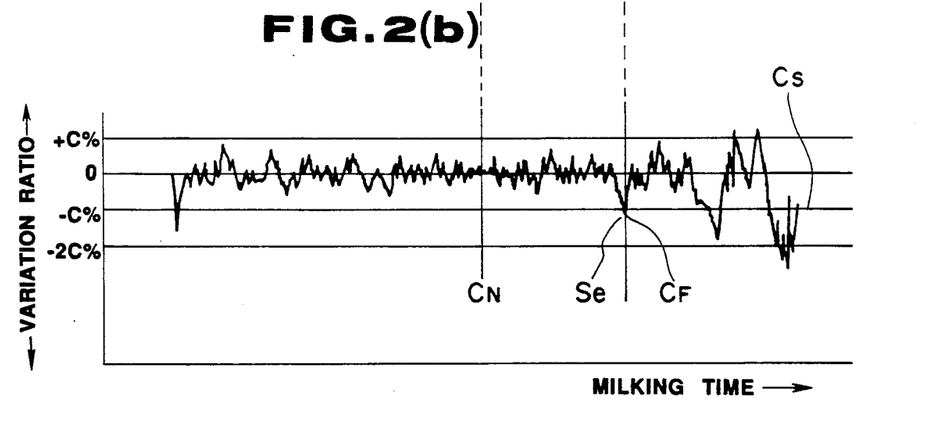

When the obtained variation ratios $C_N$ ($C_1 \ldots$) are successively plotted on a time axis, the characteristic as shown in FIG. 2(b) is obtained and it can be monitored.

As the monitoring method, the variation ratios $C_N$ ($C_1 \ldots$) can be utilized as follows.

The obtained variation ratios $C_n$ are applied to a comparison function portion 5. On the other hand, the reference ratio Cs (see FIG. 2(b)) is previously set in a reference ratio setting portion 6. The comparison function portion 5 compares the variation ratio $C_N$ with the reference ratio Cs and when the variation ratio $C_N$ is larger than the reference ratio Cs, a preparatory alarm is produced from the loudspeaker 22 through the audio output circuit 21.

The preparatory alarm is produced in the following case. That is, as in FIG. 2(a), since variation in the flow rate of milk is small in the usual milking operation, the variation ratios $C_1 \ldots$ are also small as shown in FIG. 2(b) and are within a range of the reference ratio Cs. On the other hand, the flow rate in the proximity of the end of the milking is reduced once as shown near a point F of FIG. 2(a) and then changes stepwise. This condition is based on the completion of milking for some of the nipples, and the variation ratio $C_F$ near the point F at which the flow rate is reduced exceeds the reference ratio Cs. Accordingly, such a situation can be informed by the preparatory alarm produced at this time, so that a proper countermeasure can be taken. Further, when the reference ratio Cs, the sampling period Ts and the fixed period To are selected properly, the decreasing tendency of the flow rate can be detected and accordingly the preparatory completion alarm can be produced before determination of the completion of milking, so that it can be confirmed that the milking approaches the end regardless of a well milking cow and a very poorly milking cow.

Furthermore, as the monitoring method, time display can be utilized. The time display is described with reference to FIGS. 5 to 7.

Figure 5:
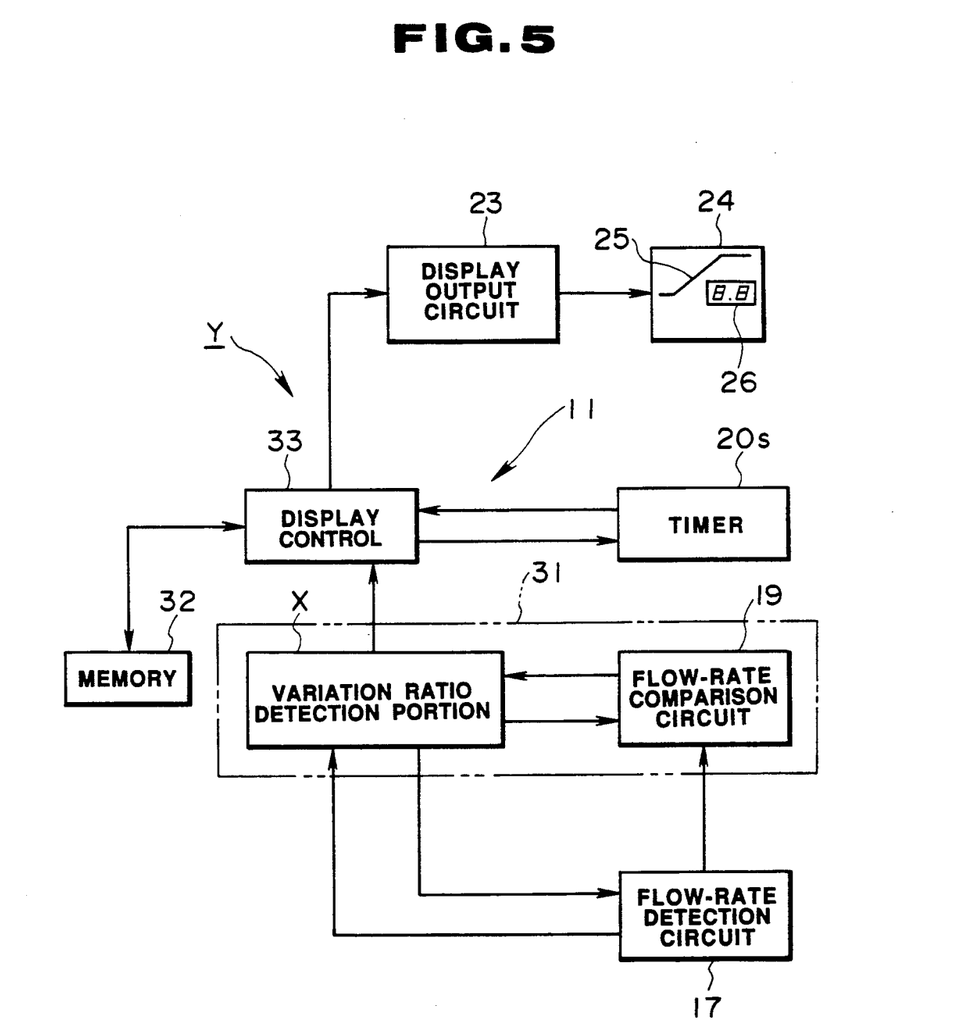
FIG. 5 is a block diagram of a time display system of the milking machine.
Figure 6:
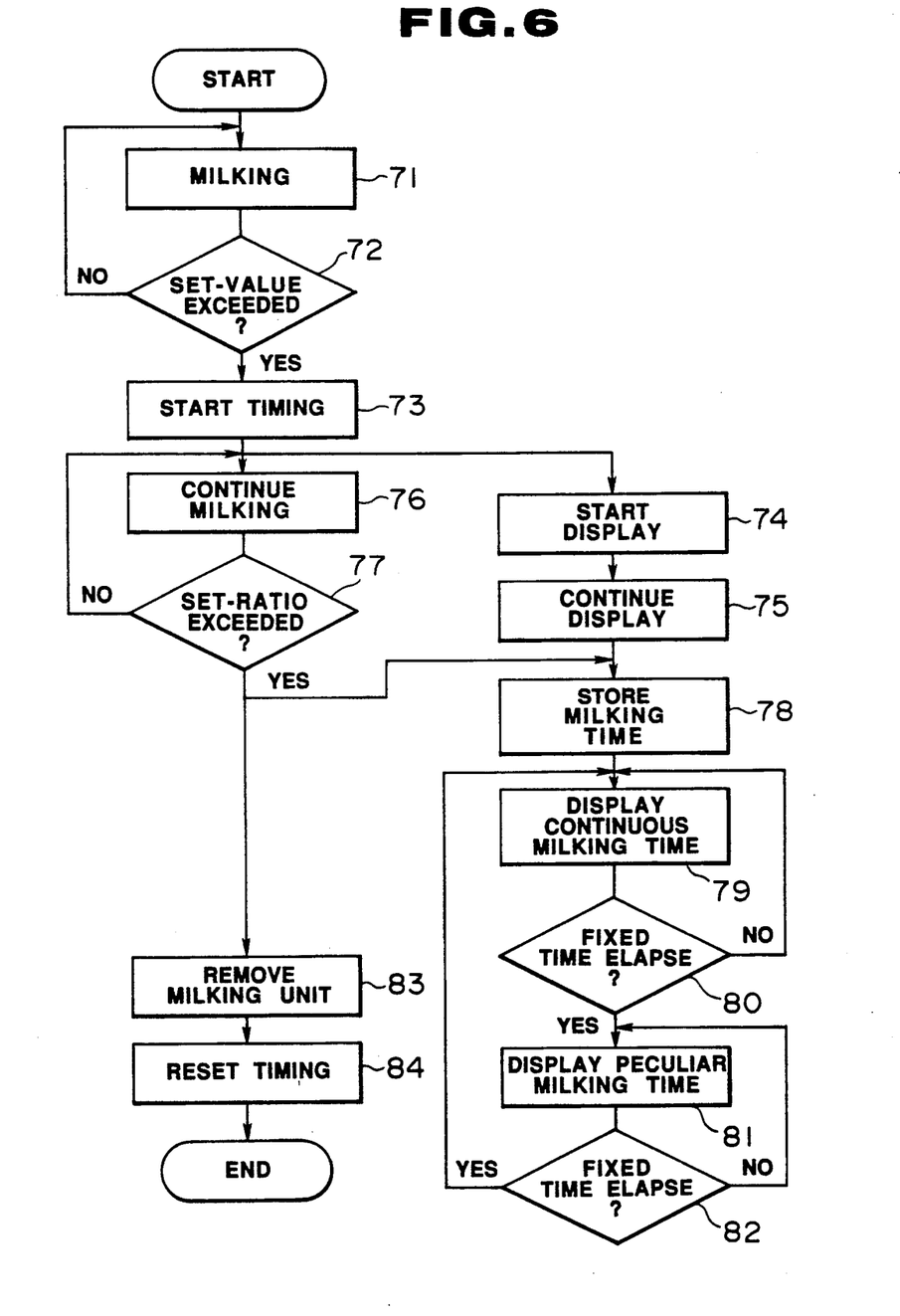
FIG. 6 is a flow chart showing a function of the time display system.

In FIG. 5, Y represents a time display system. The main control circuit includes a detection unit 31, a memory unit 32 and a display control unit 33. In this case, the detection unit 31 includes the variation ratio detection portion X for detecting the variation ratio (particularly the decreasing ratio) $C_N$ on the basis of a flow rate of milk obtained from the flow rate detection circuit 17. In this example, the time when the variation ratio $C_N$ is larger than the reference ratio Cs in the proximity of the end of the milking is detected as the milking completion reference time Se (see FIG. 2). The memory unit 32 has a function of storing a milking time (inherent milking time Tc) until the milking completion reference time Se and the display control unit 33 has a function of displaying any two or three times of the inherent milking time Tc, a milking time (additional milking time Ta) from the milking completion reference time Se and a continuous milking time Tp equal to a sum of the inherent milking time Tc and the additional milking time Ta in the digital display unit 26 of the display unit 24 after an elapse of the milking completion reference time Se. Numeral 20s denotes a milking timer connected to the display control unit 33 and is included in the timer circuit 20.

Figure 7A:
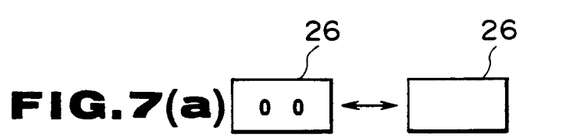
FIG. 7 illustrates display conditions of the time display system.
Figure 7B:
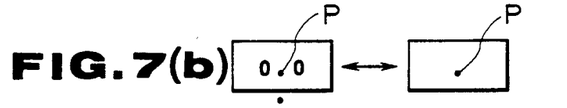

All of the display conditions starting from the beginning of the milking are now described. The teat cup liners 55 are first attached to a cow and milking is started. The flow rate of milk is increased from zero gradually (step 71 of FIG. 6) and the display unit 26 displays "00" as shown in FIG. 7(a). Display of the display unit 26 is repeatedly turn on and off at intervals of 1 second. When an actual value of flow rate reaches a predetermined value, the milking timer 20s starts its timing and this time is an actual milking start reference time (steps 72 and 73). Further, when the milking start reference time is reached, a point P is displayed at the middle of the display unit 26 as shown in FIG. 7(b) and the display unit displays "0.0". Then, the display unit 26 displays an elapsed time from the milking start reference time, that is, the milking time (steps 74 and 75). In the display of FIG. 7, a right numeral represents a unit of 10 seconds and a left numeral represents a unit of minute.

Figure 7C:
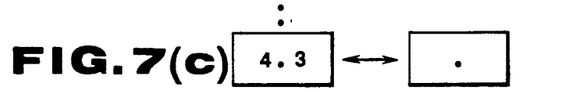
Figure 7D:
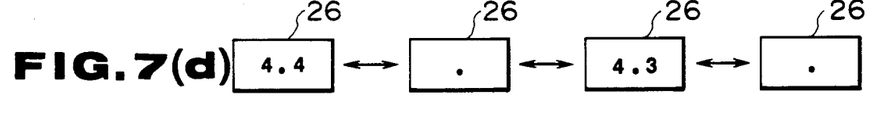
Figure 7E:
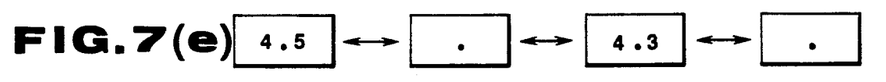
Figure 7F:
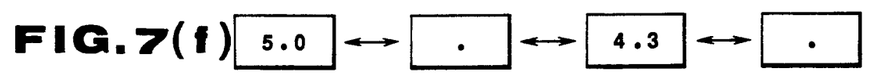
Figure 7G:
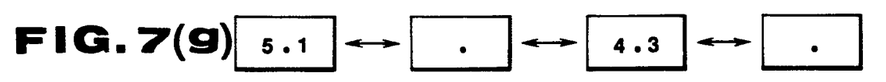
Figure 7H:
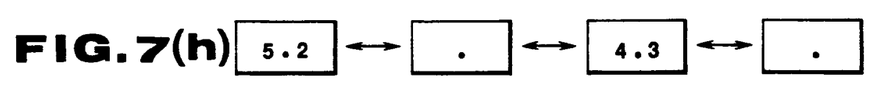

On the other hand, when the milking is continued and approaches the proximity of the end thereof, the flow rate of milk begins to be reduced and accordingly the variation ratio $C_N$ of the detected flow rate is increased. The variation ratio detection system X detects the time when the variation ratio $C_N$ is larger than the predetermined reference ratio Cs as the milking completion reference time Se (step 77). The display unit 26 displays the condition at this time as shown in FIG. 7(c). The milking time until the milking completion reference time Se is stored in the memory unit 32 as the inherent milking time Tc (step 78).

Further, after an elapse of the milking completion reference time Se, display control is made by the display control unit 33. The continuous milking time Tp equal to a sum of the inherent milking time Tc and the additional milking time Ta from the milking completion reference time Se is first displayed in the display unit 26 for a fixed time (about 2 seconds) (steps 79 and 80) and the inherent milking time Tc is then displayed for a fixed time (about 2 seconds) (steps 81 and 82). Such displays are repeated alternately as shown in FIGS. 7(d) to (h).

Accordingly, since the preparatory alarm can be produced as the milking completion reference time Se as described above, the teat cup liners 55 can be removed from the cow manually in a proper time on the basis of the preparatory alarm and the integrated time displayed in the display unit 25 (step 83). Thus, the milking is finished completely and the milking timer 20s is reset to its initial state (step 84). In this case, the additional milking time Ta may be displayed instead of the continuous milking time Tp and the milking times Tc, Tp and Ta may be displayed repeatedly in order.

With the above display, since the actually performed milking conditions can be observed exactly and collectively, cow bodies can be controlled optimally, and for example whether effective milking has been made for individual cows or not, whether unnatural milking which affects cow bodies adversely has been made or not or the like can be observed easily and exactly.

The description has been made to the embodiment in detail, while the present invention is not limited to such an embodiment. Detailed configuration and method can be modified without departing from the spirit of the invention.

We claim:

1. A method of monitoring milking, comprising the steps of:
   (a) measuring a flow rate of milk in milking to obtain a first detection value having a correlation with respect to a whole amount of milk during a fixed sampling period at any time and to obtain a second detection value having a correlation with respect to a whole amount of milk during the fixed sampling period at a fixed time earlier than the time for the fixed sampling period for the first detection value;
   (b) calculating a variation ratio of the first detection value to the second detection ratio; and
   (c) monitoring the obtained variation ratio.

2. A method of monitoring milking according to claim 1, wherein the fixed sampling period is successively set at intervals of fixed time.

3. A method of monitoring milking according to claim 1, wherein each of the detection values is a sum total or an average value of flow rate data for each fixed sampling time in the fixed sampling period.

4. A method of monitoring milking according to claim 1, further comprising the steps of:
   (d) setting a reference ratio, previously;
   (e) comparing the variation ratio and the reference ratio; and
   (f) producing an alarm when the variation ratio is larger than the reference ratio.

5. A method of monitoring milking according to claim 1, further comprising the steps of:

(d) setting a reference ratio, previously;
(e) comparing the variation ratio and the reference ratio; and
(f) setting a time when the variation ratio is larger than the reference ratio as a milking completion reference time; and
(g) displaying and monitoring two or three first milking times until a milking completion reference time, an additional milking time from the milking completion reference time and a continuous milking time equal to a sum of the first milking time and the additional milking time after an elapse of the milking completion reference time at intervals of fixed time repeatedly in order.

* * * * *